United States Patent
Brown

(10) Patent No.: US 7,634,559 B2
(45) Date of Patent: Dec. 15, 2009

(54) SYSTEM AND METHOD FOR ANALYZING NETWORK SOFTWARE APPLICATION CHANGES

(75) Inventor: Mike Brown, Brighton (GB)

(73) Assignee: Standard Chartered (CT) PLC, London (GB)

( * ) Notice: Subject to any disclaimer, the term of this patent is extended or adjusted under 35 U.S.C. 154(b) by 740 days.

(21) Appl. No.: 10/707,393

(22) Filed: Dec. 10, 2003

(65) Prior Publication Data
US 2005/0060401 A1  Mar. 17, 2005

Related U.S. Application Data

(60) Provisional application No. 60/502,421, filed on Sep. 11, 2003.

(51) Int. Cl.
G06F 15/173 (2006.01)

(52) U.S. Cl. .................. 709/224; 709/223

(58) Field of Classification Search .......... 709/223–224
See application file for complete search history.

(56) References Cited

U.S. PATENT DOCUMENTS

| | | | |
|---|---|---|---|
| 5,333,256 A | 7/1994 | Green et al. | |
| 5,390,188 A | 2/1995 | Dawson | |
| 5,410,651 A | 4/1995 | Sekizawa et al. | |
| 5,491,818 A | 2/1996 | Malatesta et al. | |
| 5,666,481 A * | 9/1997 | Lewis | 714/4 |
| 5,740,429 A | 4/1998 | Wang et al. | |
| 5,764,911 A | 6/1998 | Tezuka et al. | |
| 5,862,453 A | 1/1999 | Love et al. | |
| 5,903,877 A | 5/1999 | Berkowitz et al. | |
| 5,991,741 A | 11/1999 | Speakman et al. | |
| 6,032,184 A * | 2/2000 | Cogger et al. | 709/223 |
| 6,073,107 A | 6/2000 | Minkiewicz et al. | |
| 6,079,032 A | 6/2000 | Peri | |
| 6,113,652 A | 9/2000 | Lysik et al. | |
| 6,128,628 A | 10/2000 | Waclawski et al. | |
| 6,198,937 B1 | 3/2001 | DeClerck et al. | |
| 6,219,648 B1 * | 4/2001 | Jones et al. | 705/8 |
| 6,219,676 B1 * | 4/2001 | Reiner | 707/201 |
| 6,233,604 B1 | 5/2001 | Van Horne et al. | 709/203 |
| 6,243,451 B1 | 6/2001 | Shah et al. | |
| 6,286,039 B1 | 9/2001 | Van Horne et al. | 709/221 |
| 6,314,462 B1 | 11/2001 | Hellenga et al. | |
| 6,327,550 B1 | 12/2001 | Vinberg et al. | |
| 6,353,926 B1 | 3/2002 | Parthesarathy et al. | |
| 6,360,335 B1 | 3/2002 | Dawson | |
| 6,397,115 B1 | 5/2002 | Basden | |
| 6,401,238 B1 | 6/2002 | Brown et al. | |
| 6,411,936 B1 | 6/2002 | Sanders | |
| 6,421,737 B1 | 7/2002 | Stone et al. | 709/318 |
| 6,425,125 B1 | 7/2002 | Fries et al. | |

(Continued)

Primary Examiner—Kenny S Lin
Assistant Examiner—Brian P Whipple
(74) Attorney, Agent, or Firm—Snell & Wilmer L.L.P.

(57) ABSTRACT

The present invention discloses systems and methods for monitoring, analyzing and reporting additions or changes to network software applications. The invention is achieved through a fully or partially automated system which allows for more accurate reporting and processing of metric data. The invention may link different subsystems that run a component so that any component change is automatically updated throughout the various subsystems. Further, the present invention allows users to view information related to component changes, thereby allowing the user to seek help related to that change. This information may include metrics, statistics, and/or other data associated with the components and component changes.

19 Claims, 5 Drawing Sheets

U.S. PATENT DOCUMENTS

| | | |
|---|---|---|
| 6,446,211 B1 | 9/2002 | Colvin |
| 6,466,606 B1 | 10/2002 | Jou |
| 6,490,620 B1 | 12/2002 | Ditmer et al. |
| 6,529,784 B1 | 3/2003 | Cantos et al. |
| 6,557,169 B1 | 4/2003 | Erpeldinger |
| 6,560,569 B1 | 5/2003 | Abu El Ata |
| 6,563,798 B1 | 5/2003 | Cheng |
| 6,567,380 B1 | 5/2003 | Chen |
| 6,567,893 B1 | 5/2003 | Challenger et al. |
| 6,574,662 B2 | 6/2003 | Sugiyama et al. |
| 6,587,847 B1 | 7/2003 | Stier et al. |
| 6,604,237 B1 | 8/2003 | Giammaria |
| 6,643,696 B2 * | 11/2003 | Davis et al. ............ 709/224 |
| 6,957,257 B1 * | 10/2005 | Buffalo et al. ............ 709/224 |
| 2002/0073003 A1 * | 6/2002 | Levine ............ 705/30 |
| 2002/0087882 A1 * | 7/2002 | Schneier et al. ............ 713/201 |
| 2002/0116441 A1 | 8/2002 | Ding et al. |
| 2002/0194319 A1 * | 12/2002 | Ritche ............ 709/223 |
| 2003/0005119 A1 | 1/2003 | Mercier et al. |
| 2003/0033179 A1 | 2/2003 | Katz et al. |
| 2003/0055951 A1 | 3/2003 | Chemali ............ 709/224 |
| 2003/0065543 A1 | 4/2003 | Anderson |
| 2003/0065765 A1 * | 4/2003 | Daks et al. ............ 709/224 |
| 2003/0172152 A1 * | 9/2003 | Vaver ............ 709/224 |
| 2003/0191835 A1 * | 10/2003 | Hauck et al. ............ 709/224 |
| 2004/0093408 A1 * | 5/2004 | Hirani et al. ............ 709/224 |
| 2004/0250117 A1 * | 12/2004 | Congdon ............ 713/201 |

* cited by examiner

SYSTEM AND METHOD FOR ANALYZING NETWORK SOFTWARE APPLICATION CHANGES

CROSS REFERENCE TO RELATED APPLICATIONS

This application claims priority to, and the benefit of, U.S. Provisional patent application entitled "System and Method for Reporting and Quality Control" filed on Sep. 11, 2003, by inventor Mike Brown and assigned U.S. Ser. No. 60/502,421, the entire contents of which is hereby incorporated by reference.

FIELD OF INVENTION

This application generally relates to software applications, and more particularly, to a system and method for monitoring, analyzing and reporting additions or changes to network software applications.

BACKGROUND OF INVENTION

Existing computer systems usually include various types of processing components, or applications, and in large computer systems millions of components may be running simultaneously. To maximize the efficiency and performance of the components, the components are typically updated with new applications or problems within the components are typically monitored, analyzed and corrected. In an environment with small, localized networks, updating of components may be completed while all users are offline or by one user at a time. However, computer systems have typically evolved into a more globalized environment. Therefore, it is often no longer feasible to update various components while all users are offline because, for example, the differences in time zones across the world.

Moreover, it is very common for current users to manually monitor changes to components and the metrics associated with those changes. For example, a user usually collects information regarding when a change to a component was completed, what part of the component was changed, whether all of the components on the network are consistent, and the metrics related to the changes and processes. Because of the complexities of many computer systems today, multiple users are needed to manually monitor the various component changes and metrics. As a result, an unacceptable lag time often exists between the implementation of a change and the detection of any existing problems with the implementation. Moreover, if human error is introduced into the detection process, additional delays are possible.

Furthermore, to monitor components in an environment with numerous or complex processing components, a user often manually groups the components into appropriate computer subsystems. However, a component may be categorized under multiple subsystems. If a component is categorized under multiple subsystems, multiple users may be accessing, monitoring or changing the same component at the same time, thereby increasing errors, tracking problems and inefficiencies in a system. For example, without careful tracking procedures, multiple versions of a component may exist on a network which could cause serious system failures.

SUMMARY OF INVENTION

The present invention discloses systems and methods for monitoring, analyzing and reporting additions or changes to network software applications. In one aspect of the present invention, monitoring of system performances related to component changes is achieved through a fully or partially automated system which allows for more accurate reporting and processing of metric data, wherein the metric data may include both quality and change metrics. The system further automates changes to components, tracking of components and component changes, and modification of tracking information within a network and/or distributed system.

Moreover, the invention may link different subsystems that run a component so that any component change is automatically updated throughout the various subsystems. In this regard, the present invention includes systems and methods to record and monitor both manual and automatic component linkages and component ownership. Further, the present invention comprises a method for viewing and tracking information related to component changes, thereby allowing the user to seek help related to those changes. This information may include metrics, statistics, and/or other data associated with the components and component changes. As such, the invention increases the efficiency and turnaround time for metric reporting and system improvement.

BRIEF DESCRIPTION OF DRAWINGS

A more complete understanding of the present invention may be derived by referring to the detailed description and claims when considered in connection with the figures, where like reference numbers refer to similar elements throughout the figures, and:

DETAILED DESCRIPTION

Figure 1:
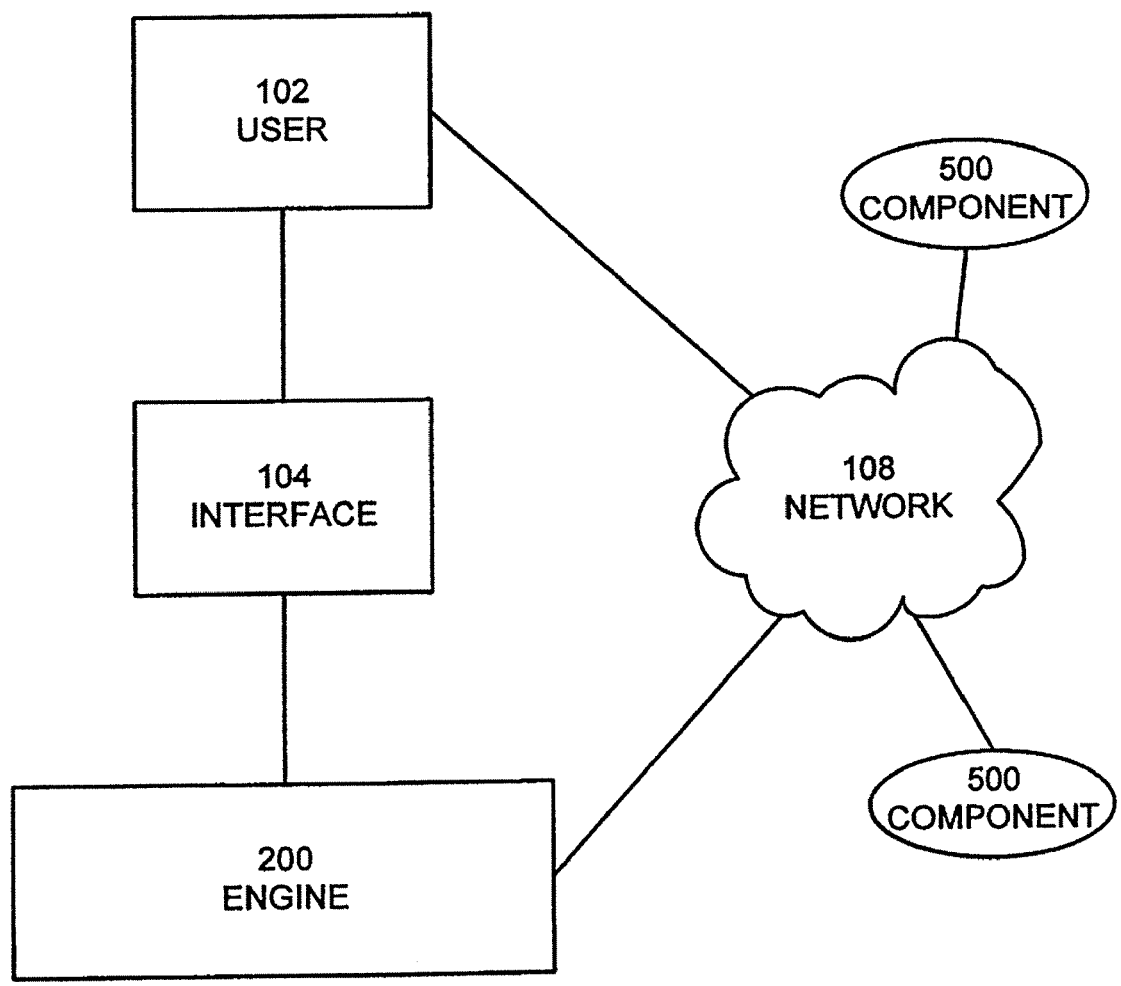
FIG. 1 presents a block diagram illustrating an exemplary system of the present invention.

The detailed description of exemplary embodiments of the invention herein makes reference to the accompanying drawings and screen shots, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain subcomponents of the individual operating components, conventional data networking, application development and other functional aspects of the systems may not be described in detail herein.

Furthermore, the connecting lines shown in the various figures contained herein are intended to represent exemplary functional relationships and/or physical couplings between the various elements. It should be noted that many alternative or additional functional relationships or physical connections may be present in a practical system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

These software components may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These software components may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The software components may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The software components of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography," by Jonathan Knudson, published by O'Reilly & Associates (1998); (3) "Cryptography & Network Security: Principles & Practice," by William Stalling, published by Prentice Hall; all of which are hereby incorporated by reference.

In general, in accordance with various aspects and embodiments of the present invention, with reference to FIG. 1, a user 102 may interact through an interface 104 to communicate with engine 200 to execute various application changes and/or to obtain information or other metrics on desired components, such as for example, component 500. Changes and/or information obtained through engine 200 may then be updated to the network 108.

As used herein, user 102 may include any person, employee, officer, entity, merchant, business, client, corporation, customer, contractor, administrator, operator, customer service representative, third-party provider, user, hardware and/or software. The user may interact with interface 104 or engine 200 via any hardware and/or software discussed herein. User 102 can be in a home or business environment with access to a network. In an exemplary embodiment, access is through the Internet through a commercially-available web-browser software package.

The term changes, as used herein, may include any addition, subtraction, deletion, recompiling, recoding, dividing, multiplying, reformatting, revision, and/or any other modification to applications, components, databases, programs, subsystems, data, and/or routines.

The user computer may provide a suitable website or other Internet-based graphical user interface which is accessible by user 102. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Intervase, etc., may be used to provide an Active Data Object (ADO) compliant database management system. Any of the communications, inputs, storage, databases or displays discussed herein may be facilitated through a website having web pages. The term "web page" as it is used herein is not meant to limit the type of documents and applications that might be used to interact with user 102. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a browser which includes a URL and an IP address. The web service retrieves the appropriate web pages and sends the web pages to the IP address.

The user computer and/or interface 104 may include any remote interface or terminal through which user 102 may remotely access any option or function associated with the engine 200. The user computer and/or interface 104 may include any of the input devices, computing units, or computing systems described herein, such as, for example, kiosk, personal digital assistant, handheld computer (e.g., Palm Pilot®, Blackberry®), cellular phone and/or the like. Access may also be obtained using a conventional card reader which recognizes a magnetic stripe or bar code associated with appropriate user identification information, a biometric device, a smart card reader which recognizes information stored on a microchip integrated with appropriate user identification information, and any other device capable of accessing, interacting, transmitting, receiving, downloading, and/or uploading application related data transmitted electronically, magnetically, optically, and/or the like.

In an exemplary embodiment, and with reference to FIG. 1, communication between user 102 and engine 200 may be accomplished through interface 104. Communication may comprise any suitable communication means, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Interface 104 may communicate with engine 200 through any of the communications networks described herein. In one embodiment, interface 104 permits user 102 to engage multiple facets of engine 200 in an interactive online communications environment. The interactive online environment made available through interface 104 is implemented in conjunction with other aspects of engine 200. Interface 104 is not limited to only one interface, as illustrated in FIG. 1, instead, interface 104 may comprise multiple interfaces that allow user 102 to communicate with engine 200. By communicating, user 102 may exchange data and/or information in any form to/from engine 200.

The computing units discussed herein may be connected with each other via a data communication network, such as, for example, interface 104. Interface 104 may be a public network and assumed to be insecure and open to eavesdroppers. In the illustrated implementation, interface 104 may be embodied as the internet. In this context, the computers may or may not be connected to the internet at all times. For instance, user 102 may be using a computer that employs a modem to occasionally connect to the internet, whereas the various components, programs and applications might be running on servers that maintain a permanent connection to the internet. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997). Loshin, TCP/IP Clearly Explained (1997). All of these texts are hereby incorporated by reference.

A variety of conventional communications media and protocols may be used for data links such as, for example, a connection to an Internet Service Provider (ISP) over the local loop as is typically used in connection with standard modem communication, cable modem, Dish networks, ISDN, Digital Subscriber Line (DSL), or various wireless communication methods. User 102 might also reside within a local area network (LAN) which interfaces to network via a leased line (T1, D3, etc.). Such communication methods are well known in the art, and are covered in a variety of standard texts. See, e.g., Gilbert Held, Understanding Data Communications (1996), hereby incorporated by reference. It will be appreciated that many aspects of the present invention could be formulated, such as, for example, one skilled in the art will appreciate that interface 104 may include any system or interface for exchanging data or transacting business, such as the Internet, an intranet, an extranet, WAN, LAN, satellite communications, and/or the like. It is noted that network 108 may be implemented as other types of networks, such as an interactive television (ITV) network.

Engine 200 may be a stand-alone system or incorporated into any pre-existing network or metrics system via any software and/or hardware customization or upgrades, engine 200 may include any hardware and/or software discussed herein. Engine 200 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, employee data, metric data, application and/or like data that could be used in association with the present invention. As those skilled in the art will appreciate, engine 200 computer will typically include an operating system (e.g., Windows NT, 95/98/2000, Linux, Solaris, etc.) as well as various conventional support software and drivers typically associated with computers.

Engine 200 may also include any monitoring system, hardware or software, configured to track/monitor systems within engine 200. One example of such monitoring system is an off-the-shelf program such as IBM's Tivoli NetView, which automatically detects problems and responds to those problems at a local level. The information from the monitoring system may be transmitted within engine 200 through any of the communications networks described herein.

Similarly, engine 200 may include, or be used in conjunction with, any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, the invention may be implemented using TCP/IP communications protocols, IPX, Appletalk, IP-6, NetBIOS, OSI or any number of existing or future protocols.

As used herein, the term network 108 shall include any electronic communications means which incorporates both hardware and software components of such. For example, network 108 may include any distributed system, such as a mainframe complex, thin cable network, Ethernet, token ring network, Intranet, Internet, Local Area Network (LAN), wide area network (WAN), and/or any other method or system of communications described herein. Network 108 may be suitably coupled to engine 200 via data links, such as a hardware and/or software interface similar to interface 104 or any of the interfaces discussed herein. In an exemplary embodiment, network 108 is an internal corporate network comprising various components, applications and subsystems.

Figure 2:
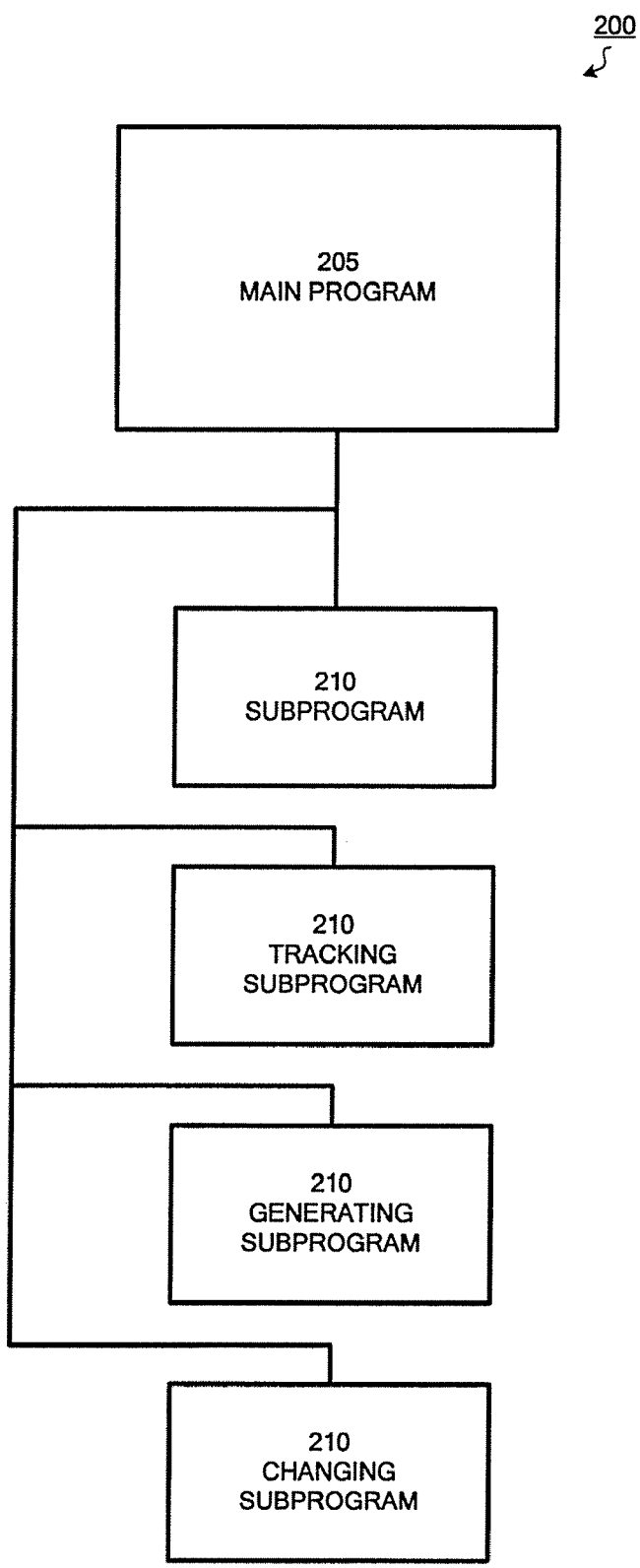
FIG. 2 presents a block diagram illustrating more details of exemplary engine 200 shown in FIG. 1 of the present invention.

More particularly, with respect to engine 200, in one embodiment illustrated in FIG. 2, engine 200 includes a main program 205 that is in communication with a suitable subprogram 210 for maintaining, storing, changing, and/or generating component information, including for example, component changes, component usage, users of components, and any other suitable component-related information. Subprogram 210 may be any type of external system, internal system or data store from which engine 200 receives or transmits information. Subprogram 210 may also be any type of database or other storage device, such as any of the database products and functions described herein for example. Subprogram 210 may also be any type of program designed for generating and tracking component data and information, and any type of program for executing and tracking changes in components. Information stored in subprogram 210 may be suitably available to users for tracking, changing, and/or analysis purposes.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with a wide variety of system components by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the network. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

While engine 200 is described herein as including one subprogram 210 that is accessed by main program 205, main program 205 may communicate with two, three, or more subprograms for maintaining, storing, changing, and/or generating component information, including component changes, component usage, users of components, and any other suitable component-related information.

In an exemplary embodiment, engine 200, as illustrated in FIG. 1, may operate in real-time. In this context, "real-time" means that engine 200 information is immediately, or nearly immediately, updated at the time the changes or other transactions are completed. As such, user 102 may immediately view or manage the changes, metrics or transactions on engine 200 via interface 104. Engine 200 may also be immediately update the changes, metrics or other transactions to network 108 such that user 102 may view changes directly on network 108 or through interface 104.

However, one skilled in the art will appreciate that engine 200 may operate in any less than real-time mode, such as, for example, batch processing. In another exemplary embodiment, the system may operate partially in real-time and partially in batch mode, wherein during batch mode, system information is stored, and periodically updated to network 108. Thus, in this embodiment, user 102 may access engine 200 at a later time through interface 104 to view or track changes.

Engine 200 interfaces with various components, wherein the components may be part of network 108. One skilled in the art will appreciate that engine 200 may interface with components directly, through network 108 or indirectly via any other system or network. In accordance with another aspect of the present invention, and with reference to FIG. 5, the invention facilitates component owner 502 having component linkage 508 and ownership 506 of one or more components 500. Owner 502 may include, for example, a user 102, an individual, a program, a subprogram, a server, or any other user or program. Component 500 may include, for example, processing applications, macros, commands, directories, databases, programs, subprograms, software, compilers, editors, kernels, sequences, and/or scripts. By component owner 502 having component ownership 506, component owner 502 may facilitate or obtain, for example, tracking, metrics, analysis, and other data relating to component ownership, changes or information.

Component 500 may also interface with various subprograms 510 via link 508. By providing linkage 508, the invention may be configured to relate one or more components 500 from separately compiled subsystems 510 into a single location for loading and executing and/or tracking component 500 changes. Relating of components 500 may be achieved through combining, ordering, organizing, tracking, associating, collating, connecting, correlating, corresponding, or any other means of collecting components 500 from various subsystems 510 into a single location. For example, a component may run within a procedure. The procedure, in turn, may be part of a job that is running on a system, such as, for example, a financial system. The financial system may be running within a region, such as, for example the United States. Different owners may be responsible for different regions, systems, jobs, procedures and/or components. Having a single location for loading, executing, linking and tracking component 500 changes enables better communication and efficiencies in fixing component failures.

Figure 5:
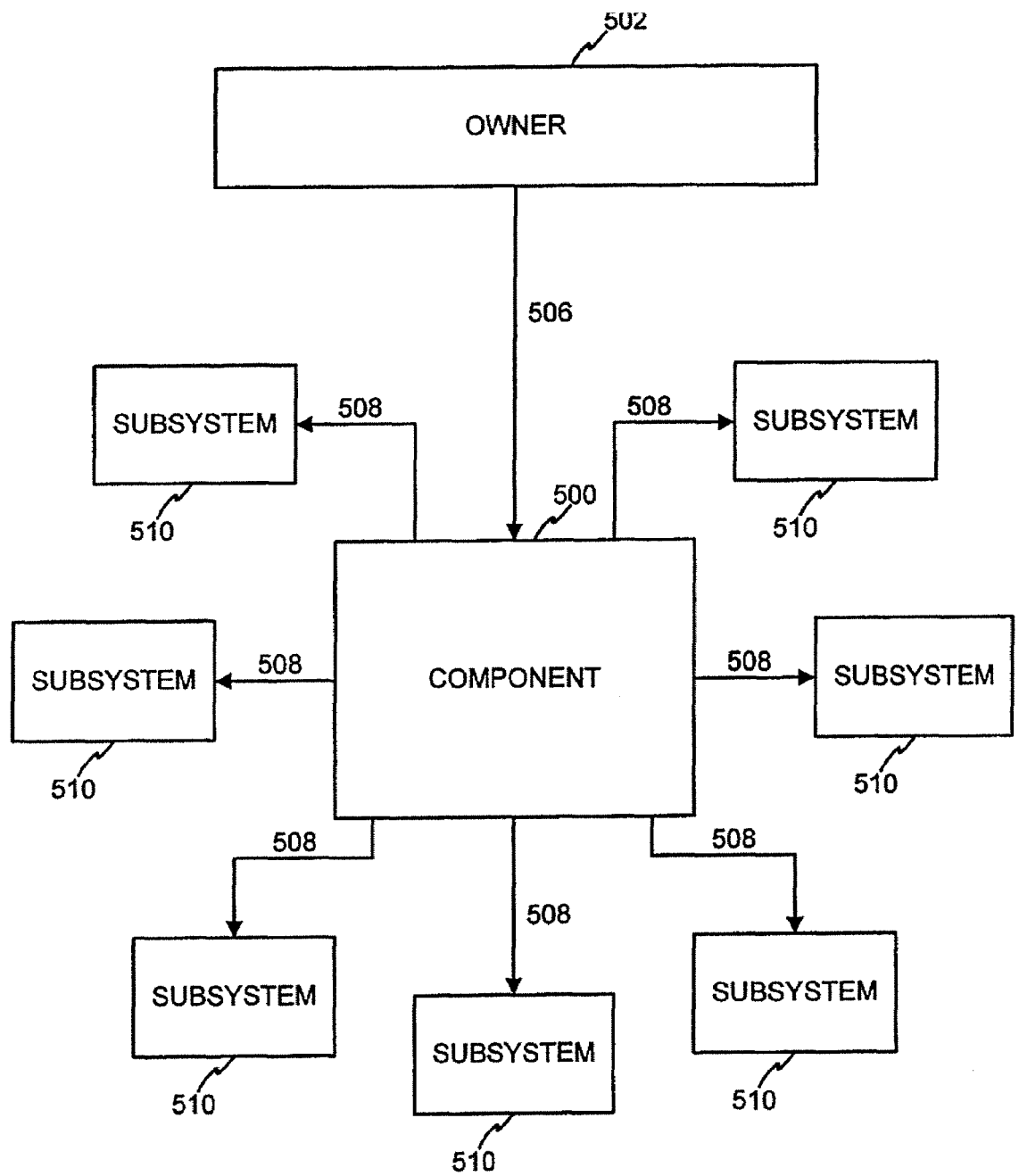
FIG. 5 presents a block diagram illustrating more details of the exemplary component 500 shown in FIG. 1 of the present invention.

The single location for loading, executing, linking and tracking component 500 changes also include a program, a server, a network, a module, a process, a macro or any other procedure or situation wherein component 500 data may be stored, changed, processed, and/or collected for any type of formatting, editing, and/or manipulating. While FIG. 5 depicts one component 500 linked to multiple subsystems 510, multiple components may be linked to multiple subsystems. Further one, two, three or more owners 502 of one or more components 500 may exist with various levels of access or use rights.

Figure 3:
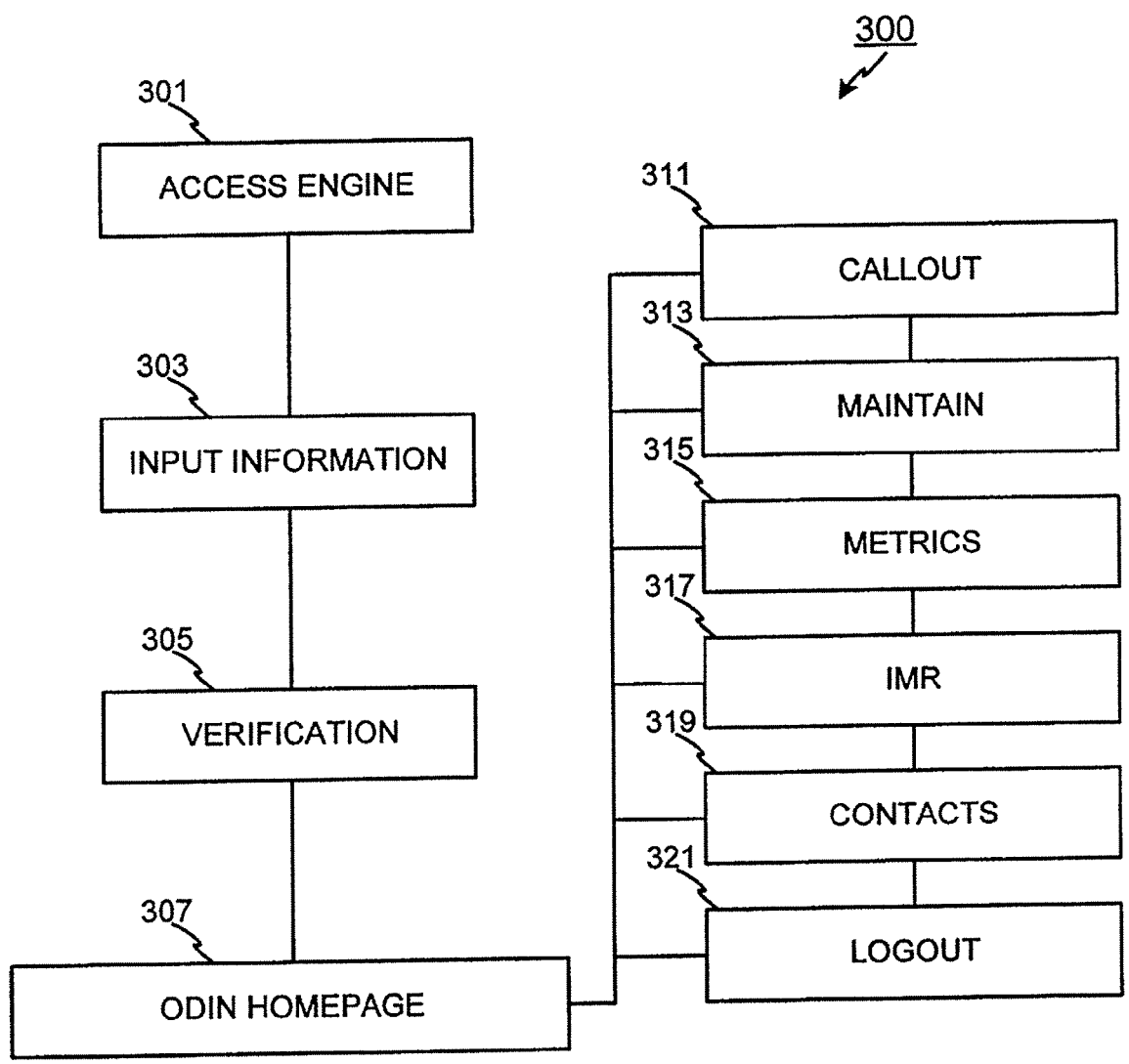
FIG. 3 presents a flowchart illustrating an exemplary method in accordance with the present invention.

With respect to the method of the present invention, and with reference to FIGS. 1 and 3, user 102 may track and/or input changes to an application or add an application using engine 200. For instance, user 102 may access engine 200 to track the changes to a financial capture application, such as, for example component 500. User 102 may also access engine 200 to input changes to component 500. Alternatively, user 102 may make changes to component 500 without access through engine 200, but by direct access 110 to component 500.

User 102 may access engine 200 through interface 104 (step 301) by any communication method discussed herein. In one embodiment, the user selects a web-based option for interfacing with engine 200, then the system presents the user with an input screen which may include a sign-on screen requesting input information (step 303) through which engine 200 may verify or authenticate if user 102 is an identified and/or valid user (step 305). Engine 200 may conduct an authorization by any method now known or hereafter devised, such as, for example, by use of cookies, or direct user input. For example, users may be presented with a temporary greeting page, which prompts user 102 for an ID, password and region of operation. The user ID may be any security and/or resource access control facility (RACF) identification or other identification mechanism. The password may be any user defined or assigned password. The authentication may also include a biometric sample, code, device, name, abbreviation, authorization/access code, personal identification number (PIN), Internet code, corporate identification number, account number, charge card, credit card, debit card, telephone card, smart card, magnetic stripe card, bar code card, and/or any other authorization system or method. Additionally, the authorization may be implemented with any form of electronic, magnetic, and/or optical device capable of transmitting or downloading data from itself to a second device.

A region selection may be included in order to limit or restrict the user from accessing, changing and/or updating certain systems or components. User 102 may be able to alter any of the identification, password, region and/or other inputted information 303 once logged onto engine 200. The engine may restrict or provide limited options for certain region selections to avoid a user from selecting a broader region than would otherwise be allowed. The region selection limits the number of systems user 102 may access, and it allows faster searching and less data for engine 200 to sort through.

Once the information is properly authenticated, users 102 are granted access to engine 200. The engine then may transmit a homepage for display on user's computer (step 307). Alternatively, users 302 not properly authenticated, either through user error or because of unauthorized use, are not permitted access to engine 200. Practitioners will appreciate that many additional security measures may be employed in accordance with the login and authentication systems and methods described herein.

Figure 4:
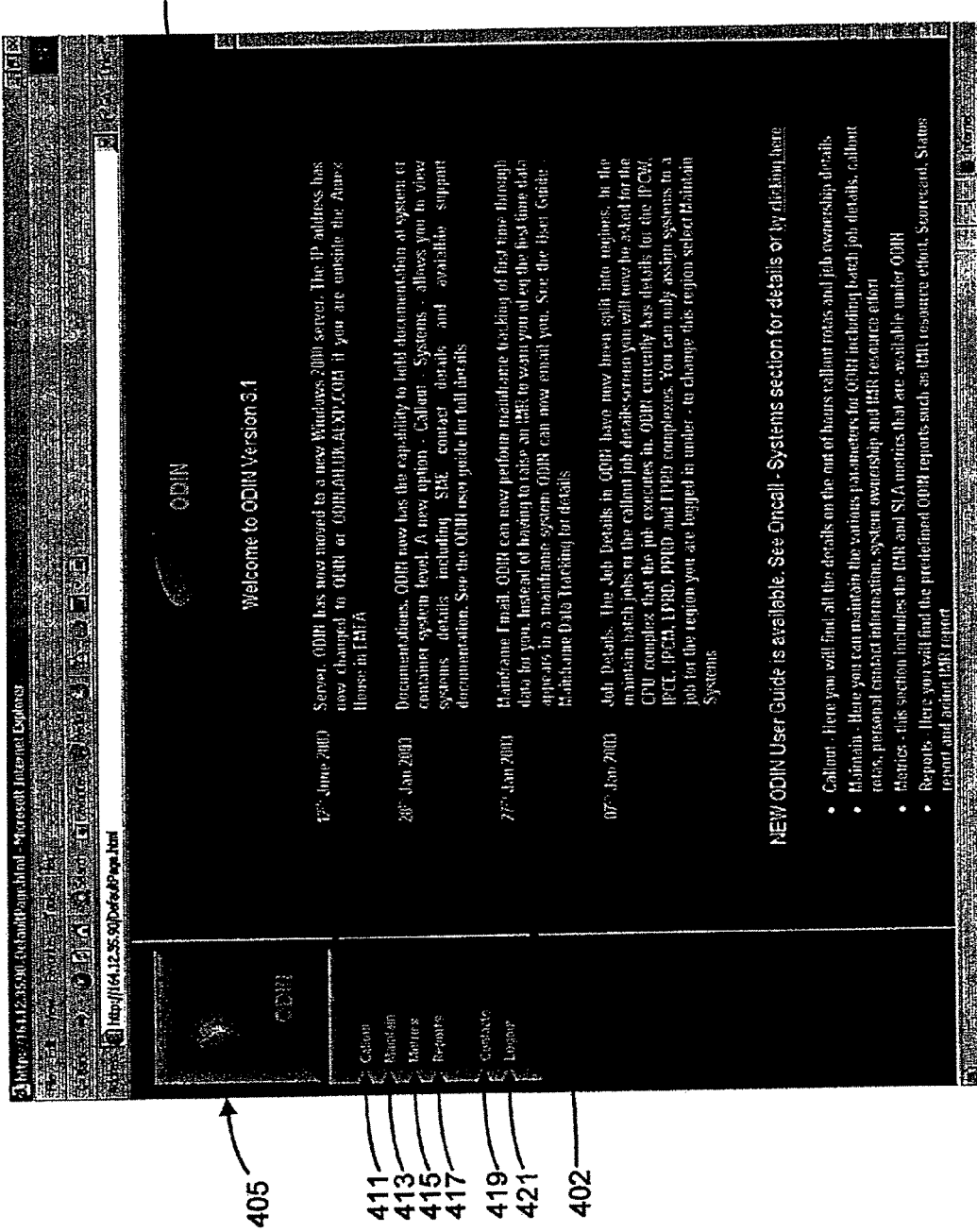
FIG. 4 presents an exemplary screen shot showing certain general feature choices of the present invention.

An exemplary screen shot of homepage 400 is illustrated in FIG. 4. The homepage 400 may present user 102 with engine 200 related information, including details of the latest changes that have been made to engine 200, network 108, components 500, or any other aspect of the system. Homepage 400 may also be configured with one or more toolbars 402 and/or task bars that facilitate navigation of engine 200. Toolbar 402 may be configured to be visible to user 102 at all times when navigating engine 200 through interface 104.

With continued reference to FIGS. 3 and 4, homepage 400 may also be configured to facilitate user 102 using toolbar 402 in selecting a variety of tasks to be performed by the present invention. These tasks may include, for example, checking the details on the out of hours call rotation (callout rotas) and component ownership, for example, "CALLOUT" 411 (step 311); maintaining various parameters for engine 200, "MAINTAIN" 413 (step 313); viewing metrics related to problem components and service level agreements (SLAs), "METRICS" 415 (step 315); viewing predefined engine 200 reports, "REPORTS" 417 (step 317); viewing details on who to contact for any difficulties experienced with the engine 200, "CONTACTS" 419 (step 319); and/or logging out of engine 200, "LOGOUT" 421 (step 321). The details of these tasks will be discussed below. In accordance with a further aspect of the present invention, the web environment may be customizable and scalable, offering various other homepage 400 options depending upon the particular needs of user 102.

In accordance with the present invention, as illustrated in FIGS. 1, 3 and 4, user 102 may interact with engine 200 through interface 104, using a mechanism for interacting such as CALLOUT 411. User 102 may access CALLOUT 411 by selecting callout on toolbar 402 or alternatively selecting it from the options section of the homepage 407. When accessing component information through CALLOUT 411, user 102 may be presented with a variety of options regarding the information accessed. These may include, for example, changing, searching, updating, viewing, adding, and/or deleting component information. New information may be entered into fields corresponding to various aspects of the component to be changed. All of the fields which allow entry of information may be free format. CALLOUT 411 may also facilitate user 102 to update changes to engine 200 by selecting on a corresponding icon or mechanism for updating. Examples of changes and implementation of changes are discussed herein.

CALLOUT 411 may include component information concerning the oncall rotations (rota) selected for an area user 102 and the out-of-call (callout) details for all the rotas for the day. Oncall rotas and callout details may correspond to the support users, groups and/or subsystems responsible for maintaining the various components. Maintenance may include fixing problems or bugs in a component, updating a component, re-coding a component, re-processing a component, or any other mechanism for updating, changing, and/or maintaining a component. CALLOUT 411 may also include information on mainframe batch job details and owners, the contact details for a person fixing a component, and the subsystems that have been defined in engine 200. Batch job details may refer to information relating to a set (a "batch") of components (or "jobs") that are executed without human intervention or with minimal intervention. Owners may include, for example, individuals, programs, subprograms, servers, or any other users or programs. Subprograms may include, for example, any database or other storage device, any type of program designed for generating and tracking component data and information, and any type of program for making and tracking changes in components. For example, user 102 may update CALLOUT 411 to provide the contact information of service groups/owners working on a specific night. If there is a job failure during that specific night, that contact information is automatically put into the problem ticket that is generated by engine 200, and the service group/owner is automatically contacted about the job failure.

CALLOUT 411 may facilitate access to previous reports user 102 or other users have generated in engine 200. These reports may be any list, chart, graph, spreadsheet, document, or any other collection of data related to an inquiry by user 102. CALLOUT 411 may also enable user 102 to view documents related to engine 200. CALLOUT 411 may also enable user 102 to view graphical interfaces which include engine 200 details and statistics. These details and statistics contained in document or graphical format may include the subsystem a component belongs to; support, development and operations owners of a component; priority of a component; and the processing timing related to that component. These details and statistics may be tracked through engine 200. Details relating to component failures may be tracked through engine 200 and/or through a monitoring program, such as NetView working in conjunction with engine 200.

In accordance with an exemplary embodiment of the present invention, as illustrated in FIGS. 1, 3 and 4, user 102 may interact with engine 200 through interface 104, using a mechanism for interacting such as MAINTAIN 413. Interactions through MAINTAIN 413 may include, for example, maintaining batch job details, callout rotas, personal contact information, system ownership, and/or problem tickets/information management record (IMR) resources. User 102 may access MAINTAIN 413 by selecting on toolbar 402 or alternatively selecting on options from homepage 400. When accessing component information through MAINTAIN 413, user 102 may be presented with a variety of options regarding the information accessed. These may include, for example, searching, updating, adding, and/or deleting component information. New information may be entered into fields corresponding to various aspects of the component to be changed. MAINTAIN 413 may also facilitate user 102 updating changes to engine 200 by selecting on a corresponding icon or mechanism for updating. Examples of changes and implementation of changes are discussed herein.

MAINTAIN 413 may allow user 102 to alter or add automatic mainframe error code details. For example, if a mainframe component fails or abnormally ends (abends), the monitoring system, such as NetView, may immediately activates engine 200 in order to detect the changes in the failed component. Engine 200 may generate a problem record relating to a portion or all relevant information about the failed component. This problem record is automatically stored as an error code. That is, engine 200 may be configured with over a thousand different error codes relating to component failures as well as explanations and proposed solutions for those error codes. These error codes and proposed solutions are available as problem records. If a failed component has an error code of the same type as a previously detected failed component, engine 200 may attach a previously generated problem report. If a failed component has an error code of a different type than a previously detected failed component, engine 20 may generate a new problem report. The information in the problem records may be automatically generated from stored information within the failed component, stored error information in engine 200, and any other stored failure information. Error codes may also exist as warning messages. Departments (groups assigned to fix an abend) and restart instructions may be assigned to the warning so that the failed components may be fixed. User 102 may also enter a description or error code for an abend that is to be automatically updated when that type of abend occurs. This way, engine 200 will not automatically generate an error code for an abend, but instead use the user-defined code.

User 102 may also use MAINTAIN 413 to select, enter and/or modify previously entered abend codes. MAINTAIN 413 may also be used to specify whether an abend is of an operational or application type, this specification may allow engine 200 to determine the owning group for the abend. For example, MAINTAIN 413 may be programmed so that all failed operational-type components are owned by operational groups. Engine 200 may also recommend routing of abends and assignment of abends to different support groups. That is, MAINTAIN 413 may be configured to set up certain codes in engine 200 so that problem tickets are not sent to a general help desk, but to a specific owning group.

User 102 may also change mainframe batch job details through MAINTAIN 413. These details may include the subsystem a component belongs to; support, development and operations owners of a component; priority of a component; and the processing timing related to that component. These MAINTAIN 413 details are often contract driven and therefore, they need to be set up initially. For example, SLAs, or service level agreements, are agreements between IT departments and business departments regarding the timing to fix failed components. Maintaining these SLAs is important in order to minimize down time for the business departments.

MAINTAIN 413 may be used to change component details in a variety of manners. For example, user 102 may select multiple components from a list or task bar and update all of those components with the same details. User 102 could also enter new component details in a field box adjacent to the component name of the component to be changed.

MAINTAIN 413 may also facilitate user 102 in maintaining components that belong to multiple subsystems. For example, if user 102 selects a range of components that belong to more than one subsystem, user 102 may view the selected components on a display that may be split by subsystem name. User 102 may then select a new subsystem for the component by selecting on the pull down list and selecting a new subsystem. User 102 may maintain components in any other way known in the art for selecting, viewing, and maintaining information.

MAINTAIN 413 may also be configured to enable user 102 to add new batch jobs to engine 200. By adding new batch jobs directly into engine 200, engine 200 will know who the job owners are those jobs fail. Consequently, engine 200 may alert the job owner as soon as a failure is detected.

To add new batch jobs, user 102 may type in or select the components comprising a new batch job and the subsystems that a batch job belongs to in order to add that information. MAINTAIN 413 may also facilitate the confirmation of historical/personal data relating to the operation of engine 200. For example, once user 102 makes a change to a component, the change may be checked and verified by engine 200 or by a second user. MAINTAIN 413 may allow for user 102 to determine whether this verification process has occurred.

User 102 may also edit and create the callout rotas used by various areas and auto-problem tickets/information management record (IMR) resources through MAINTAIN 413. In order to edit a rota, MAINTAIN 413 may be configured to automatically update information into a rota once user 102 selects the rota to be changed. Rotas may also be edited manually. To create a new rota, user 102 may need to enter information relating to the rota including, for example, a name, a start date, and security information relating to the oncall personnel associated with the rota. MAINTAIN 413 may automatically generate a rota based upon this user 102 information. User 102 may set up more than one person per day for the rota. User 102 may also update and view the rotas entered.

MAINTAIN 413 may also be configured to accept or reject component changes entered by user 102. For example, MAINTAIN 413 may be configured to track all changes that are made to a component in any environment that the component is installed. If a mainframe batch job fails, MAINTAIN 413 may be configured to perform an impact analysis on the batch job by examining any programs, procedures or parameters that have changed within that batch job. If MAINTAIN 413 finds any changes have been made, it may facilitate the automatic updating of the IMR associated with that batch job. Updating may include change details and component information. User 102 may also manually enter data relating to failed batch jobs using MAINTAIN 413.

MAINTAIN 413 may be configured to allow user 102 to search for and maintain outstanding changes (unaccepted changes) or accepted changes. For example, if user 102 releases a changed component, user 102 will be responsible for fixing that component any time it fails. Upon verification that the change in the component works, Maintain 413 will automatically change the status of the component from an outstanding change to an accepted change.

User 102 may search for changes in several ways including, for example, searching by a prefix assigned to a component (by user ID of the person who changed the component, by the name of the component, by the date of a change or by a listing of all changes since a given date), by selecting from a list of currently outstanding or accepted components, or by any other method of searching known in the art.

MAINTAIN 413 may place the outcome of user's 302 search in a report format. For example, user 102 may view a report of all the changes and/or components that match user's 102 selection criteria. This report may include the component name, date of change, description of change, and information relating to the support assigned to the component change. MAINTAIN 413 may also be configured to allow user 102 to manually accept or NOT accept changes listed in the change report, email the change report, and/or print the change report.

Data relating to failed component changes (change failure data) may be available through MAINTAIN 413. For example, a monitoring system, such as NetView, may detect a failed component change. NetView may then activate engine 200, and engine 200 may generate problem and tracking data for the failed component change. User 102 may then access this data through MAINTAIN 413. This data may be used for reporting purposes and may aid in the quality ratings of changes and projects. Change failure data may also provide details related to specialists who can or have already helped fix the failed components. Failed components may also be configured through MAINTAIN 413 to have normal support assigned to them.

MAINTAIN 413 may also be configured to enable user 102 to maintain the umbrella for a group of subsystems with engine 200 by creating containers for the groups. For example, if three separate subsystems x, y and z exist on engine 200, user 102 can create a container A and use Container A to collate all the separate components existing within subsystems x, y, and z. The Container systems may be useful for metric reporting because it allows user 102 to categorize components with as much detail as possible for easier fixing and reporting of failures. If a user 102 assigns a subject matter expert (SME) to a container system, that same SME will also be assigned to all the systems under that container. An SME may be any person, program, and/or subsystem that is designated to fix and/or provide support to a specific subject or component problem.

MAINTAIN 413 may also be configured to report department details for use in callout situations and some reporting options. For example, a failing component is attached to a subsystem, that subsystem is attached to a support or development department and in turn a callout rota is attached to that department. The department is therefore the "owner" of the component and may be responsible for maintenance and tracking of that component. A department may be comprised of various callout personnel and the personnel may report on various aspects of the failing component. User 102 may create a new department and enter a title, contact details and any other relevant information related to the department. User 102 may also create a rota for the department and that rota may vary depending on the circumstances of the component failure. User 102 may also edit existing department information to change ownership of a component.

MAINTAIN 413 may also be configured to provide a time period for non-supported component records. For example, if user 102 changes a component that is released in production, MAINTAIN 413 may use the callout details on the component record instead of the normal callout rota. As a normal process, user 102 may inform the support area for the system when to hand over out-of-hours support. Engine 200 may also be configured to automatically accept changes on behalf of the department. These automatically accepted changes may include preventative maintenance items such as disc space increases.

User 102 may also use MAINTAIN 413 to capture details on time spent working on engine 200. User 102 may update the time spent on IMRs in many ways including, for example, selecting the date an update was performed in order to search and retrieve all updates since that date and selecting an IMR by an ID associated with that report. Once user 102 has accessed time associated with an IMR, user 102 may view and/or update various details associated with component problem solving including, for example, time that was spent in getting round the initial problem; time spent finding out the root cause of a problem; the time spent permanently fixing the problem; whether a problem was caused by a component change; and the subsystem that the problem arose in. These various details are automatically collected and tracked by engine 200 as soon as a component is released onto network 108. MAINTAIN 413 allows organized access to these tracking details.

MAINTAIN 413 may also be configured to allow user 102 to move components from one subsystem to another. This feature may be helpful because users and/or engine 200 may mistakenly assign components incorrectly when they are first updated onto network 108. Components may be moved to any number of subsystems at any number of times. User 102 may move a component by any mechanism known for moving components including, for example, use of a graphical interface to effectuate the move, use of component lists, and use of subsystem lists.

User 102 may also change the contact details for personnel working on IMRs through MAINTAIN 413. Changes may include searching, updating, adding, and deleting contact details. Details that may be changed may include, for example, names, email addresses, phone numbers, mailing addresses, departments, department relations, responsibility levels, locations, whether personnel are vendors, the date personnel are due to move offsite, whether personnel are able to work from home, and the expiration date, if any, of personnel visas.

MAINTAIN 413 also enables user 102 to search for, maintain and view/print reports on project ratings. User 102 can search by project ID, date, or any other method to locate the project rating desired. Once a project rating is located, user 102 may display the details of a project, problems associated with a project, production support information, and any other such project information. Project details may include, for example, the number of individual components released, the size of a project, the number of problems caused by a component change, the number of production support hours spent on fixing problems associated with the project, the business impact of any problems associated with the project, and a rating generated by engine 200 based on the project details.

If the project releases batch components, engine 200 may not allow the project to be rated if any of those components are not associated with subsystems. This may be helpful for emergency fixes of a component where rating and release may not occur until a better solution or fix is implemented. Engine 200 may also be configured to alert user 102 through MAINTAIN 413 of any unassigned components.

MAINTAIN 413 may be configured to allow user 102 to set up a collection of component groups in order to collate reports. This collection of component groups is known as a region. User 102 may generate reports and metrics on individual groups or on a region or multiple regions. By selecting a region, user 102 may obtain a report that includes all of the component groups that have been set up under that region. User 102 may select regions in any manner including: selecting a region from a menu, typing in the full name of the region, typing in part of the name of the region, and highlighting the name of the region. User 102 may also create, alter, update, or delete regions or component groups within a region.

MAINTAIN 413 may also be configured to allow user 102 to set up, view, and/or change mainframe system details. These mainframe system details may include subsystem names, the group that is responsible for development of the subsystem, the group that is responsible for supporting the subsystem, the group that provides operational support for the subsystem, whether support for the subsystem is provided overseas, locally or both, the service personnel that is responsible for the subsystem, any other personnel responsible for the subsystem, the prefix that the subsystem is released under, a list of the IDs of the local and/or overseas SMEs, and any documentation relevant to the subsystem to be stored in engine 200 and be made available through CALLOUT 411.

MAINTAIN 413 may also be configured to allow user 102 to refresh the internal engine 200 tables at any time or by permission only. The internal tables may hold static information on internal servers, because processing may be faster using locally cached tables. Because this data is static, administrators may want to limit the personnel that may change or update the data. User 102 may refresh by selecting on any icon, word or table configured for refreshing engine 200 tables. MAINTAIN 413 may also facilitate the updating of restart information for batch jobs. That is, user 102 and/or engine 200 is aware of a particular issue with a component, user 102 and/or engine 200 may have special instructions for the component automatically entered into a problem record in order to let others know how to solve the component failure. For example, when a mainframe batch job abends engine 200 may be configured to fill out an IMR that contains as many details about the failing job as possible. Part of these details may be freeform text that can be used to aid the programmer in fixing the abend.

MAINTAIN 413 may also be configured to allow user 102 to maintain fixing instructions for failed batch jobs. In order to maintain these fixing instructions, user 102 may search, edit, add, delete and change fixing instructions through MAINTAIN 413. Further, MAINTAIN 413 may be configured to automatically display one or more specific fixing instructions when a select abend occurs. MAINTAIN 413 may also be configured to automatically display one or more specific fixing instructions for two, three, or more select abends.

User 102 may assign users to groups that have already been created. User 102 may also add a new group and/or update existing groups. MAINTAIN 413 may be configured to facilitate any number of user groups. MAINTAIN 413 may also be configured to allow user 102 to be automatically assigned to a default user group if user 102 does not have a group assigned to him. Default user groups may be changed through MAINTAIN 413 as well. MAINTAIN 413 may also be configured to enable automatic and/or manual administrative changes through an authorization process. An authorization process may include any mechanism for providing access to MAINTAIN 413 links to users who are authorized for access. Any unauthorized user may be directed to an interface stating such and providing further options. For example, MAINTAIN 413 may create various user groups and/or assign users to already created groups for implementing an authorization process. As part of this authorization process, MAINTAIN 413 may be configured so that only select users with administrative rights can access and make administrative changes. MAINTAIN 413 may be configured with an authorization process for any activities conducted through MAINTAIN 413.

In accordance with an exemplary embodiment of the present invention, as illustrated in FIGS. 1, 3 and 4, user 102 may interact with engine 200 using METRICS 415. Metric data may be manipulated through METRICS 415. Metric data may include, for example, the number of IMRs assigned to areas; the average number of daily IMRs on a group's queue; and the number of Service Level Agreements (SLAs) met for mainframe batch jobs. These will be discussed in detail herein.

User 102 may access METRICS 415 by selecting on toolbar 402 or alternatively selecting on options from homepage 407. When accessing component information through METRICS 415, user 102 may be presented with a variety of options regarding the information accessed. These may include, for example, processing, display, editing, and/or any other type of manipulation of metric data. New information may be entered into fields corresponding to various aspects of the metrics to be changed/viewed. All of the enterable fields may be free format. METRICS 415 may also facilitate user 102 in updating changes to engine 200 by selecting on a corresponding icon or mechanism for updating.

METRICS 415 may be configured to provide metrics relating to the number of IMRs assigned to service groups. These metrics may be confined to a specific date or to a range of dates. METRICS 415 may also be configured to provide metrics that rank IMRs in terms of severity, time spent on the IMRs, or any other ranking desired for problem components. User 102 may display metric data in a variety of ways. These include, for example, display by group, region, date, and user. METRICS 415 automatically obtains this information from databases within engine 200.

METRICS 415 may be used to automatically generate and/or place metric data into a spreadsheet program. Spreadsheets may include, for example, Excel, Quattro Pro, Lotus 123, or any other program designed to facilitate the manipulation and display of data. METRICS 415 may also be configured to store the spreadsheet data for user 102 to access when desired. METRICS 415 may be configured to automatically include various codes associated with the closure of an IMR. That is, once a failed component has been fixed, a closure code may be generated. METRICS 415 may also be configured to not automatically include these codes or any other codes. METRICS 415 may be configured to allow user 102 to manually rank IMRs to include in metrics reports. The ranking may relate to the severity of an IMR. That is, the more problematic components may have higher rankings. METRICS 415 may also be configured to provide automatic rankings for metrics reports.

METRICS 415 may also be configured to facilitate the generation of graphs, charts, or any other informational display of metric information. For example, user 102 may access METRICS 415 to generate a graph of the total number of problems passing through a service group. In order to produce the graph, METRICS 415, for example, may be configured to check the assignment history for all IMRs and use information about IMRs that have been assigned to a specific area. If an IMR has been passed back and forth between service groups several times, METRICS 415 may be configured to report on each of those assignments.

METRICS 415 may be configured to produce specialized graphs of the total number of IMRs passing through a service group based on specific, user 102 defined criteria. For example, METRICS 415 may produce a specialized graph broken down by user 102 defined closure codes, ranking levels, or time periods. METRICS 415 may be configured to produce specialized graphs of the total number of IMRs passing through a service group based on specific, automatically-defined criteria as well.

METRICS 415 may also be configured to produce general or specialized graphs based on metrics relating to the average number of daily IMRs on a service group's queue. For example, METRICS 415 may be configured to search the IMR assignment history to work out the ownership of an IMR on a particular day and to calculate the number of IMRs that any particular service group has worked that day. METRICS 415 may also be configured to provide information regarding the total number of IMRs a service group has worked on by month, quarter, year, or any other time period desired.

User 102 may also access METRICS 415 to view the number of service level agreements (SLAs) met for mainframe batch jobs over a specific time period. SLAs refer to the expected completion time to fix component problems.

METRICS 415 may be configured to facilitate user 102 in displaying information on missed SLAs by service group or region. For example, the SLAs metrics may be used to track the mainframe batch jobs that are held in engine 200. The execution history for each job is taken from a mainframe scheduling package. METRICS 415 may be configured to check the execution time for each job that has been set up with an SLA and to check them against the expected completion times. METRICS 415 may be used, for example, to produce graphical totals of the executions of jobs within systems that are owned by a service group or to calculate a total percentage SLAs missed during a specific time period.

In accordance with an exemplary embodiment of the present invention, as illustrated in FIGS. 1, 3 and 4, user 102 may interact with engine 200 using REPORTS 417. REPORTS 417 may be configured to generate reports including, for example, reports on all IMRs that are over a specific age; scorecards for a service group user 102 selects; status reports for the service group user 102 selects over a specified time period, which may include details on the number of IMRs brought forward, new IMRs, and closed IMRs; the effort spent per IMR for the service group user 102 selects; the effort spent over a specified time period on specific IMRs or all IMRs; the IMRs and their rankings in various stages for the selected service groups; and previously generated reports by user 102. REPORTS 417 automatically obtains this information from databases within engine 200. These will be discussed in detail herein.

User 102 may access REPORTS 417 by selecting on toolbar 402 or alternatively selecting on options from homepage 407. When accessing component information through REPORTS 417, user 102 may be presented with a variety of options regarding the information accessed. These may include, for example, processing, display, editing, and/or any other type of generation of report data. New information may be entered into fields corresponding to various aspects of the metrics to be changed/viewed. All of the enterable fields may be free format. REPORTS 417 may also facilitate user 102 in updating changes to engine 200 by selecting on a corresponding icon or mechanism for updating.

REPORTS 417 may be configured to produce reports on IMRs over a specific age. For example, these reports may show the number of IMR logs that are on a particular queue or set of queues that are over a certain age. REPORTS 417 may facilitate the production of a report on the average number of IMRs that are present on a queue in any specified time period. For example if, a service group had an IMR that was 15 days old on its queue on June 1st, REPORTS 417 may report this IMR as over 30 days old on the 15th of June and count it as being present until the IMR is closed or reassigned. This would give an average 30-day IMR count of 0.5 for that service group over the June period (assuming the IMR was not closed or reassigned till after the end of June). The calculation being that there was an IMR over 30 days old present for 15 days of a 30-day month.

REPORTS 417 may be configured to produce an ageing IMR report that shows the trend in the number of aging IMRs that a queue or region is responsible for over a specified time period. User 102 may select a ranking, timing or any other criteria to limit a report. Reports may also be limited automatically through REPORTS 417.

REPORTS 417 may also be configured to produce a variety of other reports. These other reports include, for example, lists of all the contact details and visa statuses for all the subsystems with primary SME contact details held in engine 200; lists of all the contact details and visa statuses for all the subsystems with secondary SME contact details held in engine 200; a list of all the offshore supported subsystems that do not have personnel associated with them; a list of all the completely onshore supported subsystems held in engine 200; a list of all the delegates that are set up in engine 200; and the updates done by all the delegates within as selected time period. Primary SME contacts may include any local or onshore service resources. Secondary SME contacts may include any overseas or non-local service resources. Delegates may include any person, program, computer or other entity configured to update component and/or network information in engine 200.

REPORTS 417 may be configured to generate scorecards for any service group user 102 selects. These scorecards may cover any specified time period, including, for example, one day, one week, one month, quarterly, an/or annually. REPORTS 417 may also be configured to generate graphs and/or other display mechanisms for displaying scorecard summaries. REPORTS 417 may also be configured to generate status reports for any service group user 102 selects. These status reports may cover any specified time period, including, for example, one day, one week, one month, quarterly, and/or annually. REPORTS 417 may also be configured to generate graphs and/or other display mechanisms for displaying status report summaries.

REPORTS 417 may also be configured to allow user 102 to produce reports showing the effort, or time spent per IMR for the service group user 102 selects. For example, user 102 may use REPORTS 417 to generate a report based on the service group effort in terms of resources used, the number of systems owned, the difficulty associated with the root cause of an IMR, or based on all three of these efforts. User 102 may also select different user IDs to generate a report based on the effort entered by each of the selected users for a selected period. User 102 may also generate a report based on all the IMRs worked on by each of the selected users, wherein the time may be broken down in terms of time spent circumventing a problem, figuring out the root cause of a problem, and/or fixing a problem.

REPORTS 417 may also be configured to facilitate the production of reports showing the effort spent on different problems for a service group that user 102 selects for a specific time period. For example, the report may show the effort spent on various activities relating to solving IMRs for the selected groups.

REPORTS 417 may also be configured to enable user 102 to produce a report of an IMR, including the change in the IMR's ranking over a specified time period. For example, REPORTS 417 may list all the IMRs for a selected group for a selected period with details of which group opened the IMR and the date and ranking of the IMR when it is opened. REPORTS 417 may also list the current queue with the date and ranking of the IMR. If an IMR has been closed, REPORTS 417 may also list this fact.

In accordance with an exemplary embodiment of the present invention, as illustrated in FIGS. 1, 3 and 4, user 102 may interact with engine 200 using CONTACTS 419. CONTACTS 419 may be configured to allow user 102 to view details of who to contact for any difficulties experienced with engine 200. CONTACTS 419 automatically obtains this information from databases within engine 200.

User 102 may access CONTACTS 419 by selecting on toolbar 402 or alternatively selecting on options from homepage 407. When accessing component information through CONTACTS 419, user 102 may be presented with a variety of options regarding the information accessed. These may include, for example, processing, display, editing, and/or any other type of generation of report data. New information may be entered into fields corresponding to various aspects of the metrics to be changed/viewed. All of the enterable fields may be free format. CONTACTS 419 may also facilitate user 102 in updating changes to engine 200 by selecting on a corresponding icon or mechanism for updating.

In accordance with an exemplary embodiment of the present invention, as illustrated in FIGS. 1, 3 and 4, user 102 may interact with engine 200 using LOGOUT 421. LOGOUT 421 may be configured to allow user 102 to log out of engine 200. User 102 may access LOGOUT 421 by selecting on toolbar 402 or alternatively selecting on options from homepage 407. Once user 102 accesses LOGOUT 421, user 102 might be presented with a display or screen verifying that user 102 has logged out of engine 200.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:

1. A method for network management comprising:
loading, by a network management engine, a first component for execution;
linking, by the network management engine, the first component to a network wherein the first component is one of a plurality of components linked to the network;
modifying, by the network management engine, operating parameters of the first component;
tracking changes to a plurality of components in the network through the network management engine;
modifying tracking information for a second component by the network management engine, wherein the second component is one of the plurality of components;
implementing tracking modifications to the second component made by the network management engine on the network;
detecting a failing component based at least in part on the tracking changes;
in response to the detecting, the network management engine automatically:

performing an impact analysis to identify related components, wherein said related components are part of the plurality of components and, wherein said related components are associated with said failing component through the tracking information;

generating a problem ticket, wherein the problem ticket comprises tracking information related to the failing component, wherein the failing component is one of the plurality of components;

determining an owning group of the failing component based upon the tracking information;

routing the problem ticket to the owning group; and tracking repair status information for repairing the failing component; and automatically comparing the repair status information to a pre-established service level agreement specifying a level of service expected for repair of the failing component by the owning group.

2. The method of claim 1 wherein one or more of the plurality of components is accessible to users on the network.

3. The method of claim 1 wherein the changes to the plurality of components comprises at least one of adding, dividing, multiplying, recompiling, recoding and removing of a component.

4. The method of claim 1, further comprising accessing two or more subprograms of the network to facilitate modifying operating parameters of the first component.

5. The method of claim 4, wherein the operating parameters comprise at least one of a subsystem assignment, component ownership information, component priority, desired failure processing time, component usage, and component access restrictions.

6. The method of claim 5, wherein the operating parameters are based at least in part on the pre-established service level agreement.

7. The method of claim 1, further comprising selecting a region associated with the first component, wherein the region restricts modification rights associated with the first component.

8. The method of claim 1, further comprising:

monitoring the first component in response to the loading of the first component;

notifying an owner of the first component in response to a failure associated with the first component; and automatically accepting the loading of the first component in response to a lack of a failure to associate with the first component.

9. The method of claim 1, further comprising modifying the plurality of components in a real-time batch process.

10. The method of claim 9, including moving the first component to a different subsystem of the network.

11. The method of claim 1, further comprising grouping the network into containers to facilitate collation of the plurality of components.

12. The method of claim 1, wherein the network management engine is accessible using a web-based interface.

13. The method of claim 1, wherein the tracking changes further comprises updating a database with the changes to the plurality of components, wherein the database is configured to store the changes to the plurality of components in the network.

14. A computer-readable medium tangibly embodying a plurality of instructions, the plurality of instructions comprising:

instructions to load a first component for execution;

instructions to link the first component to a network, wherein the first component is one of a plurality of components linked to the network;

instructions to modify operating parameters of the first component;

instructions to track changes to a plurality of components in the network through an network management engine;

instructions to modify tracking information for a second component by the network management engine, wherein the second component is one of the plurality of components;

instructions to implement tracking modifications to the second component made by the network management engine on the network;

instruction to detect a failing component based at least in part on the tracking changes;

instructions to respond to a detection of the failing component by automatically:

performing an impact analysis to identify related components, wherein said related components are part of the plurality of components and, wherein said related components are associated with said failing component through the tracking information;

generating a problem ticket, wherein the problem ticket comprises tracking information related to the failing component, wherein the failing component is one of the plurality of components;

determining an owning group of the failing component based upon the tracking information; and routing the problem ticket to the owning group; and instructions to track repair status information for repairing the failing component; and instructions to automatically compare the repair status information to a pre-established service level agreement specifying a level of service expected for repair of the failing component by the owning group.

15. The method according to claim 14, wherein the instructions to modify tracking information includes assigning metrics to the changes to the tracking information.

16. A network management system comprising:

a network interface communicating with a memory;

the memory communicating with a processor; and the processor, when executing a computer program, is configured to:

load a first component for execution;

link the first component to a network, wherein the first component is one of a plurality of components linked to the network;

modify operating parameters of the first component;

track changes to a plurality of components in the network through an network management engine;

modify tracking information for a second component, wherein the second component is one of the plurality of components;

implement tracking modifications to the second component;

detect a failing component based at least in part on the tracking changes;

in response to the detecting, the network management system is configured to:

perform an impact analysis to identify related components, wherein said related components are part of the plurality of components and, wherein said related components are associated with said failing component through the tracking information;
generate a problem ticket, wherein the problem ticket comprises tracking information related to the failing component, wherein the failing component is one of the plurality of components;
determine an owning group of the failing component based upon the tracking information; and
route the problem ticket to the owning group; and
track repair status information for repairing the failing component; and
automatically compare the repair status information to a pre-established service level agreement specifying a level of service expected for repair of the failing component by the owning group.

17. The system of claim 16 wherein the network management engine is configured to provide access to multiple subprograms.

18. The system of claim 16 further comprising:
a mechanism for tracking information related to the changes in one or more components of the plurality of components.

19. The system of claim 16 further comprising:
a mechanism for making changes to one or more components of the plurality of components, wherein the changes to the plurality of components comprises at least one of adding, dividing, multiplying, recompiling, recoding and removing of a component.

* * * * *

UNITED STATES PATENT AND TRADEMARK OFFICE
CERTIFICATE OF CORRECTION

PATENT NO. : 7,634,559 B2 Page 1 of 1
APPLICATION NO. : 10/707393
DATED : December 15, 2009
INVENTOR(S) : Mike Brown It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1191 days.

Signed and Sealed this

Ninth Day of November, 2010

David J. Kappos
*Director of the United States Patent and Trademark Office*